United States Patent
Naraghi (10) Patent No.: US 9,735,911 B1
(45) Date of Patent: Aug. 15, 2017

(54) SYSTEM AND APPARATUS FOR MULTI USER COMMUNICATION OVER A SINGLE FIBER

(71) Applicant: Manouher Naraghi, Torrence, CA (US)

(72) Inventor: Manouher Naraghi, Torrence, CA (US)

(*) Notice: Subject to any disclaimer, the term of this patent is extended or adjusted under 35 U.S.C. 154(b) by 0 days.

(21) Appl. No.: 15/390,614

(22) Filed: Dec. 26, 2016

(51) Int. Cl.
    *H04J 14/00* (2006.01)
(52) U.S. Cl.
    CPC .................. *H04J 14/007* (2013.01)
(58) Field of Classification Search
    CPC .......................................... H04J 14/007
    USPC ........................................................ 398/78
    See application file for complete search history.

(56) References Cited

U.S. PATENT DOCUMENTS

| | | | | |
|---|---|---|---|---|
| 5,289,299 A | * | 2/1994 | Paek ...................... | G03H 1/041 359/29 |
| 5,410,147 A | * | 4/1995 | Riza ...................... | H04B 10/50 250/214 LS |
| 5,760,941 A | * | 6/1998 | Young .................. | H04J 14/005 398/183 |
| 6,236,483 B1 | | 5/2001 | Dutt et al. | |
| 6,470,023 B1 | | 10/2002 | Upton | |
| 7,200,342 B2 | | 4/2007 | Dafesh | |
| 7,339,717 B2 | * | 3/2008 | Peer ...................... | H04J 14/005 359/326 |
| 7,646,980 B1 | * | 1/2010 | Menendez ............ | H04J 14/007 380/256 |
| 8,244,137 B1 | * | 8/2012 | Chen .................. | H04B 10/1121 398/118 |

* cited by examiner

*Primary Examiner* — Juan A Torres (57) ABSTRACT

A system and apparatus includes an optical masking unit that is configured for applying a user's mask code. The mask code has a code length of at least equal to a number of users. A light source unit is coupled to the optical masking unit. The light source unit includes a number of coherent lasers. The number of coherent lasers is at least equal to half the number of users. Each of the coherent lasers is configured for operation at a different specific prescribed operating frequency. A modulation unit is configured for applying the user's data to the coherent lasers. An optical combiner unit is operable for combining outputs of the coherent lasers to an optical fiber input.

18 Claims, 4 Drawing Sheets

Fig. 4

SYSTEM AND APPARATUS FOR MULTI USER COMMUNICATION OVER A SINGLE FIBER

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to optical fiber communication systems. More particularly, the invention relates to multiple-users Code Division Multiple Access (CDMA).

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Numerous bodies of literature have applied the principles of Code Division Multiple Access (CDMA) to the optical regime by proposing to employ wide band sources at the transmitters along with orthogonal optical codes (masks) in both transmitter and receiver systems in order to be able to put a relatively large number of users on a single strand of fiber for reliable communication.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. A system shows an optical fiber communications system using spread spectrum code division multiple access techniques to achieve better bandwidth utilization. A transmitting user in the system encodes a wide band incoherent optical source using a first coding mask, and a receiving user decodes the received signal using two decoding masks, all of the masks having lengths N.

By way of educational background, another aspect of the prior art generally useful to be aware of is that a direct-sequence-spread-spectrum (DSSS) optical -frequency-shift-keying (OFSK) code-division-multiple-access (CDMA) communication system is adapted with optical transmitters and receivers for preferred use fiber optical communication systems where modulated data and pseudorandom noise (PRN) codes are encoded in the optical domain and communicated over optical paths for increasing system capacity in wide area optical networks.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter. Moreover, for any claim of the present invention which claims an embodiment "consisting essentially of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/ dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Many embodiment, and variations thereof provide techniques for multiple access communication on fiber using coherent sources and orthogonal optical codes. Many embodiments may employ multiple coherent sources such as, without limitation, laser arrays in multiple access fiber optics communication. Some embodiments may employ multiple coherent sources or laser arrays in conjunction with orthogonal optical masks. Some embodiments may provide for design and definition of specific operating frequencies for each coherent source for every user. Some embodiments may provide techniques to synthesize required operating optical frequencies when all coherent sources may be at the same frequency. Many embodiments may increase transmission capacity of fiber optics communication systems. Some embodiments may provide for add and drop of users in fiber optic communication systems. Embodiments of the present invention provide a new and unique coder/decoder, transmitter/receiver, system that may enable a large number of digital data users on a single strand of fiber for communication purposes. This, then, may allow for multiplying capacity of existing fibers many folds without laying any new fiber. In some embodiments, the receiver may be a differential receiver. In many embodiments the transmitter may employ an array of coherent lasers for each user where each laser may be required to be at a very specific prescribed frequency. This construct may allow for error free communication.

It is well known that fiber possesses a large bandwidth capacity in the order of many tens of Tera Hertz. Present technologies that use fiber optics for communication may utilize a very small fraction of this capacity which is around 10 giga bits per second. This number comes about by digitally multiplexing a number of slower data channels, users, together and the limit of 10 giga bits per second arises from a reality that at such speeds, an operating limit of digital systems may be reached. Therefore, in order to be able to tap into the large communication capacity of fiber optics, a multi-user, channel, technology may be required to put these data on the fiber and be able to retrieve every user, channel, data uniquely and robustly. One such technology is the Optical Code Division Multiple Access (OCDMA) where orthogonal optical codes are used in order to optically code each user's data, spread it over the optical operating band and decode it at the receiver. Many attempts may have used this construct along with a wide band incoherent source in each transmitter in order to achieve above stated goal. It is believed that these techniques may be lacking primarily because the nature of the incoherent source, used in every transmitter, may not allow for nulling of the user-to-user interference even though orthogonal optical codes have been employed. If one examines the incoherent source signal for an optical bin n that is of the form:

$$v_j(t,n) = A_j(n)\cos(\omega_n t + \phi_j(n)) + B_j(n)\sin(\omega_n t + \phi_j(n))$$

where subscript j denotes user j, one may realize that this is quite a complex stochastic signal, carrier, that must be in consideration along with orthogonal optical codes in design of multi-user communication systems. It is believed that this fact may be overlooked in much of existing proposed techniques. Embodiments of the present invention are based on taking this fact into consideration in development of a unique methodology and technique for designing high performance multi-user communication systems employing a coherent laser array for each user.

In the present invention, a methodology is presented where a number of digital data users may be able to communicate with one another using a single strand of fiber optic. This technique may enable one to take advantage of the large bandwidth capacity of a strand of fiber in order to send the high speed data of a large number of asynchronous users on a strand of such fiber, and may provide for uniquely receiving the data of any of those users. This methodology, therefore, may provide for design of:

1—Optical networks with relatively large number of users.
2—Fast high capacity data bus for super computers.
3—Large capacity fiber optic transmission.
4—Add/Drop capability in fiber optic communication.

In the present invention, the method assigns a pre-selected optical mask to each user where these masks are chosen from a set of orthogonal codes. One set of such codes are the bipolar Hadamard codes which are generated according to the following rule in a matrix form:

$A_1 = 1$ $$A_{2i} = \begin{vmatrix} A_i & A_i \\ A_i & -A_i \end{vmatrix}$$

Each code corresponding to a row or column of such matrix. Of course, in optical domain a "−1" in such codes is replaced by a "0".

At the transmitter a particular user's digital data may modulate an array of narrow band coherent lasers, each placed at a very specific frequency. These digitally modulated signals may be first "passed through" the user's unique optical mask and may then be combined optically before being put on the fiber.

At the receiver, the fiber optic signal, which contains the data of all users, is split into two beams providing two identical optical paths. In order to uniquely receive the data of a desired user, one of these optical signals is passed through the optical mask of the desired user the other optical signal is passed through the complement of the same user's optical mask. Outputs of these two paths are differentially summed and digitally detected to determine if the user of interest had sent a "0" or a "1".

Not only may this system enable one to use a large amount of bandwidth that exists on a strand of fiber, but this methodology may also be used in design and building of robust optical switches.

Figure 1:
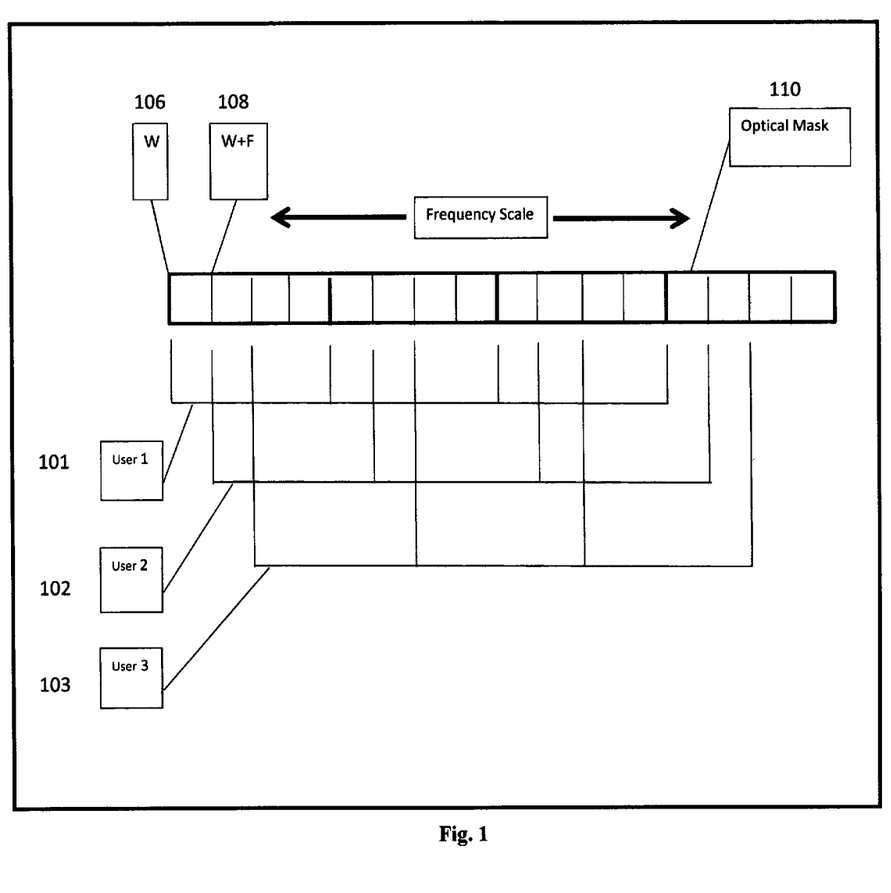
FIG. 1 illustrates a graphical representation of a three user system, in accordance with an embodiment of the present invention.

FIG. 1 illustrates a graphical representation of a three user system, in accordance with an embodiment of the present invention. In the present embodiment, the representation depicts an optical mask 110 having a first bin 106 and bandwidth 108. The present embodiment further depicts the assignment of user 1 101, user 2 102, user 3 103, and user 4 104.

For a system of N transmitters, each may be assigned a number between 1 and N along with a unique optical code of length N chosen from an orthogonal code set developed by Walsh or Hadamard as has been previously described in literature and defined above. Each transmit station (user) may be assigned a unique optical code of length N where N is a number which must be power of 2. Thus an optical code may be N contiguous optical bins where each bin is either opaque to the optical frequencies under consideration (a "0") or is completely transparent (a "1"). These optical masks 110 may be made using various materials including, but not limited to, clear and opaque glass, clear and opaque film, liquid crystal, light sensitive strips using nano technology, etc. Of course, major advantage of using nano technology strips or liquid crystal masks is that they may simply be turned on/off (programmable) by providing/cutting off power to them. Therefore, assignment of an optical channel to a user may be done under control of a central processor. Accordingly, when a user may be finished transmitting data, its optical code is returned to the central processor and ready to be assigned to any new user.

Each transmit station also include N lasers, coherent optical sources, for each user. These entire N user specific lasers may be tuned to specific frequencies as described below and are all digitally modulated by that same user's data. Each optical bin may be denoted from 1 to N, from low to high frequency. If the bit rate of each user is denoted by f, which is the same for all users, the bandwidth of each optical bin by F and the starting frequency of the first optical bin by W then the frequency of the first user's lasers from 1 to N may be tuned to:

[W], [W+F], [W+2F], . . . , [W+(N−1)F]

The second user's lasers frequencies may be shifted by the bit rate f from these frequencies, so they may be at:

[W+f], [W+F+f], [W+2F+f], . . . , [W+(N−1)F+f]

In general, laser frequencies of the j-th user may be, in ascending order:

[W+(j−1)f], [W+F+(j−1)f)], [W+2F+(j−1)f], . . . , [W+(N−1)F+(j−1)f]

In the present embodiment, the sum total of the bandwidth of all users equals the bandwidth of one optical bin.

In a non-limiting example, if there are 32 users each using 10 GB, then the system throughput and a chip, optical bin, bandwidth will be 320 GB and the CDMA Optical Code length will be 320×32=10240 GHz=10.24 THz. 10.24 Tera Hertz corresponds to approximately 56 nm at a laser environment of 1300 nm.

In another non-limiting example, if there are 256 users each using 1 GB, then the system throughput and a chip bandwidth will be 256 GB and the CDMA optical code length will be 256×256=65536 GHz=65.536 THz.

All of each user's lasers may modulated by that particular user's digital data as shown in FIG. 1.

Figure 2:
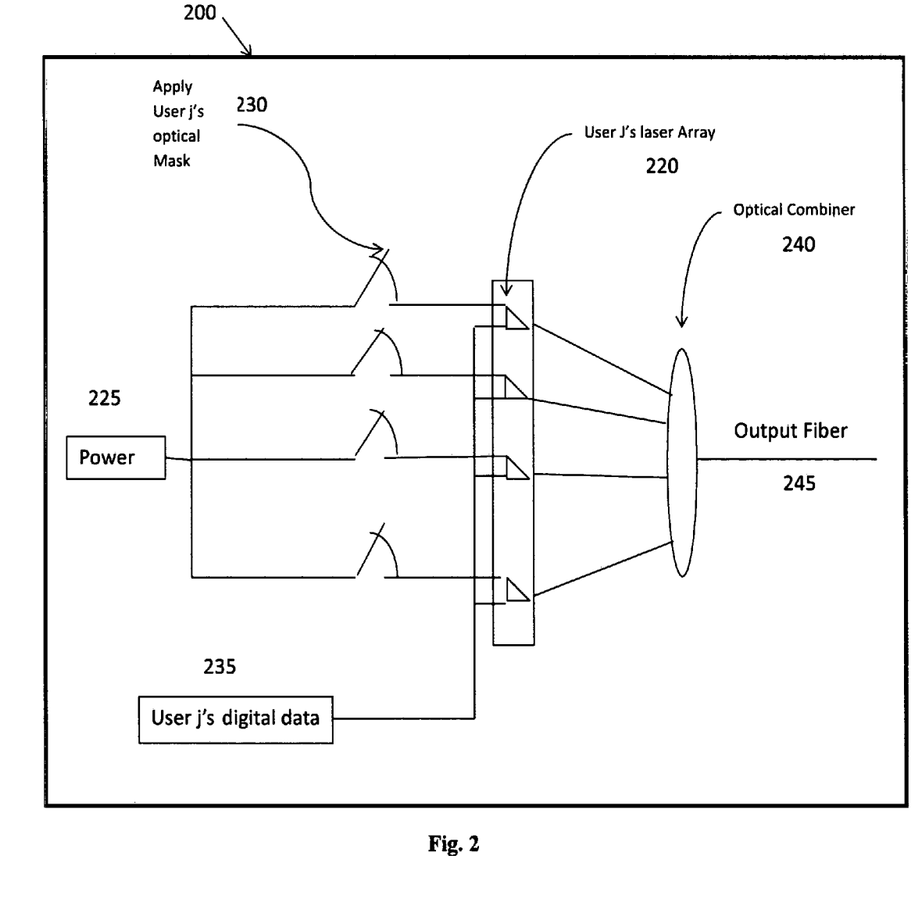
FIG. 2 illustrates an exemplary transmitter, in accordance with an embodiment of the present invention.

FIG. 2 illustrates an exemplary transmitter, in accordance with an embodiment of the present invention. In the present embodiment, transmitter 200 may include a laser array 220, a power supply 225, mask switches 230, data input 235, an optical combiner 240, and an output fiber 245. In the present embodiment, the optical mask information may be incorporated in the overall transmission scheme by simply turning each laser "on" or "off" based on the value of its assigned optical mask using switches 230. Due to the property of the optical masks, for any given user, half of its lasers may be powered up and half may be off. In a non-limiting example, if the system is to serve N users, then each user may need to have N/2 lasers in its transmitter. Frequencies of these N/2 lasers may be those that fall within the transparent optical mask bins, corresponding to value "1", of that user. There may be no need to employ the other N/2 lasers since their frequencies fall within the opaque optical mask bins, corresponding to value "0", of that same user and these signals may never be transmitted. Even though only N/2 lasers may be required at each transmit station, but in dynamical environments where users come on line and drop off, this technology may enable one to have an array of N lasers at each transmitter, with previously prescribed frequencies, and through a simple digital processor assign/take back optical codes to/from any user. This may provide a simple solution to the add/drop problem of users.

Figure 3:
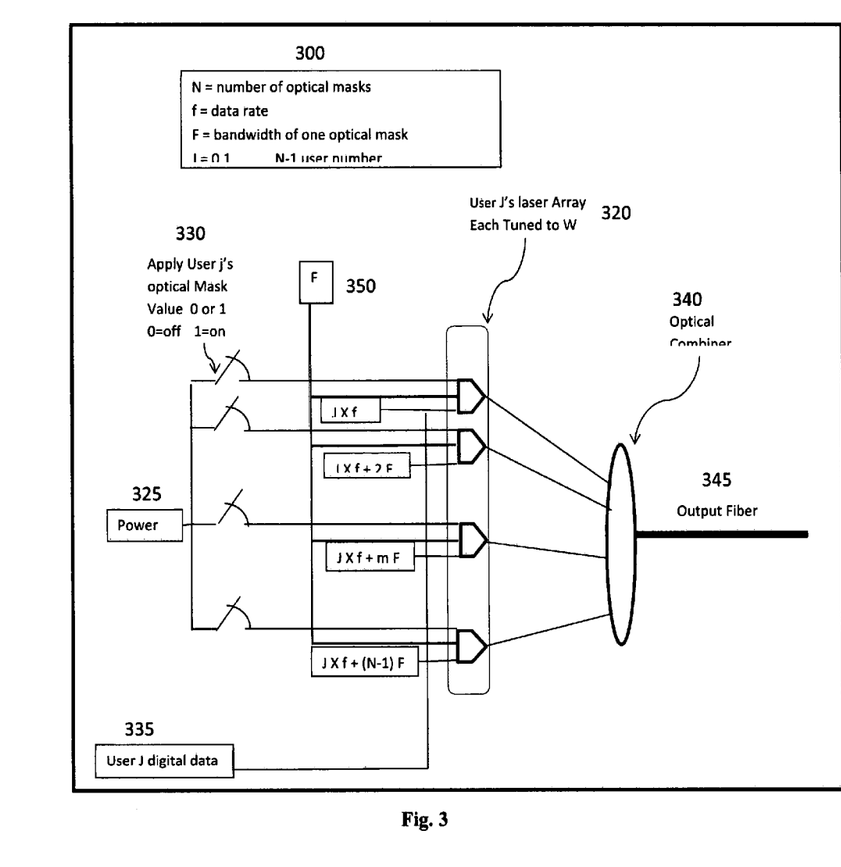
FIG. 3 illustrates an exemplary transmitter, in accordance with an embodiment of the present invention.

FIG. 3 illustrates an exemplary transmitter, in accordance with an embodiment of the present invention. In the present embodiment, transmitter 300 may include a laser array 320, a power supply 325, mask switches 330, data input 335, a frequency input 350, an optical combiner 340, and an output fiber 345. In the present embodiment, transmitter 300 may be configured using identical lasers in array 320, instead of each laser at specific frequency. In the present embodiment, the N, or N/2 identical lasers 320 at each station may have the property that each laser may be dual modulated. Then, one modulation port may used to input user data 335 and the other port may receive data 350 from a frequency generating network in order to move each laser's operating frequency to the desired value. As shown in FIG. 3 where W is the operating frequency of each laser, F is the bandwidth of an optical bin and f is user data bit rate. The frequency generating subsystem may generate all modulating frequencies for the N lasers in each transmitter. These modulating frequencies, may effectively, move each laser frequency to the desired value before modulation by the user data. For example, in FIG. 3, the modulation frequency of J×f+mF means that the m-th laser (1<m<N) in transmitter of user J may be shifted up from W (initial laser frequency) by the sum of user number J times data rate f (J×f) and the product of that optical bin number (m) and optical bin bandwidth F (mF). In the present embodiment, lasers of all transmitters may be the same.

Figure 4:
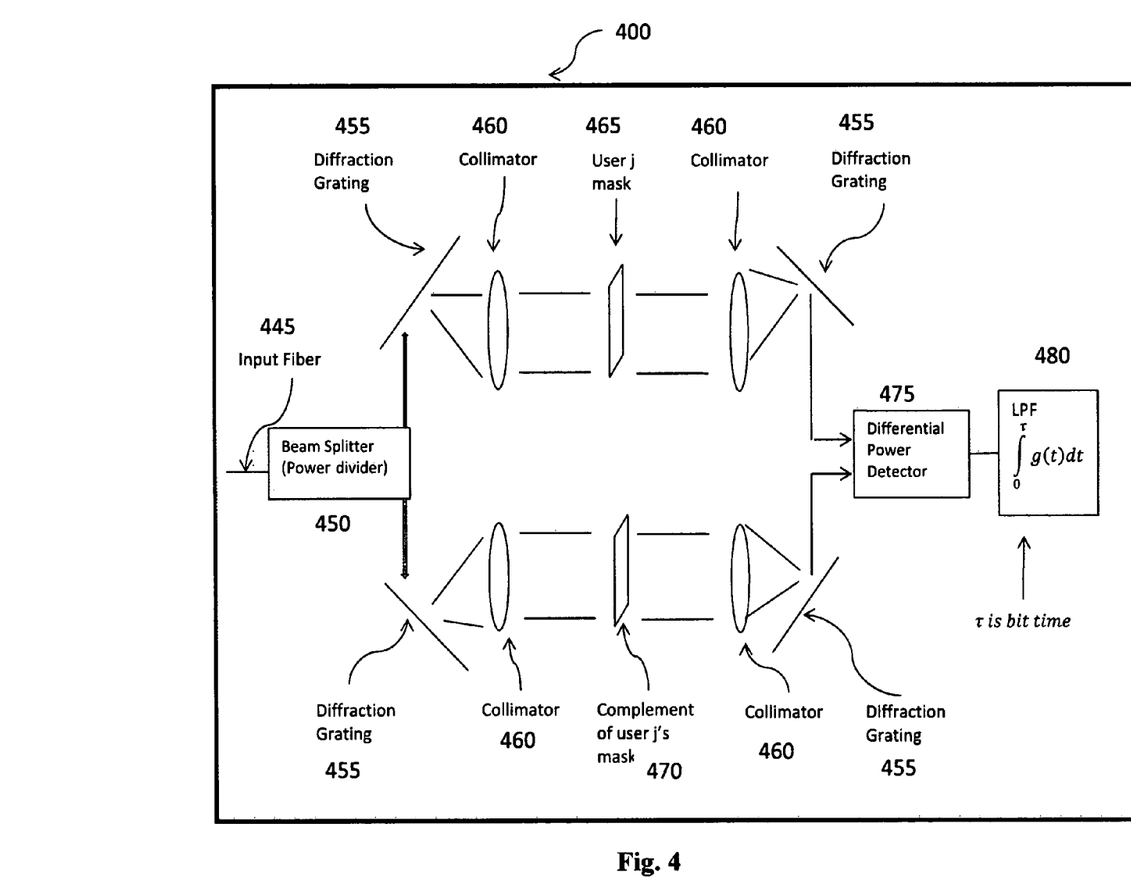
FIG. 4 illustrates an exemplary receiver, in accordance with an embodiment of the present invention.

FIG. 4 illustrates an exemplary receiver, in accordance with an embodiment of the present invention. In the present embodiment, a receiver 400 may include an input fiber 445, a beam splitter 450, diffraction gratings 455, collimators 460, a user mask 465, a complement user mask 470, a differential detector 475, and a low pass filter 480. In the present embodiment, an architecture of receiver 400 may be the same for all users. At any receive station, in order to receive the data put on the fiber 445 by a user, for example user j, receiver 400 may be tuned to that user j. This tuning may done by using user j's optical mask 465 and its complement 470 in the decoding path as shown in FIG. 4. In the present embodiment, input fiber 445, which carries the data from all users, goes through a beam slitter, power divider, 450 in order to provide two optical paths, beams. A diffraction grating 455 may be put in the path of each beam in order to expand the beams in their frequencies. Each expanded beam then may be collimated 460 and passed through optical mask 465 of the particular user and its complement 470. These two optical signals may then be collimated and 460 turned into two beams using two diffraction gratings 455. The two beams are then differenced and detected in differential detector 475 producing an electronic signal which is a function of time. Ideally this signal may be integrated over the bit time interval τ and subjected to a threshold in order to determine if a "0" or a "1" was sent by user j. This integration may be replaced by using a low pass filter (LPF) 480. In designing LPF 480 care may be taken so that this filter has sharp drop off characteristic. This may enhance the signal to noise ratio (S/N) of a final digital detection process.

Some embodiments of the present invention may be utilized in Long Haul and Point to Point Communication. This may basically increase capacity of existing fiber optic communication systems by a large number without laying down any new fiber. Each data channel may be treated as a user and may go through coding and decoding process. This may be of interest to communication companies, cable companies and wireless providers for hauling the back bone data.

Some embodiments of the present invention may be utilized in High Speed Secure Fiber Optic Local Area Networks. In these embodiments a digital controller may employed along with a proper protocol keeping track of who is coming on line to allocate to them an optical code and who is going off in order to claim back that particular optical code. In these embodiments all data communication may be achieved on a single fiber that connects all users. A high security may be achieved by the fact that all data is on the fiber.

Some embodiments of the present invention may be utilized in an optical data bus in super computers and/or computers having multi processors. Such environments may require, without limitation, buses with high speed data capacity, large number of data channels, dynamical ability to assign a data channel to a specific task for a specific duration of time and to free that channel for other tasks after present task is finished. Embodiments of the present invention may satisfy these requirements.

In embodiments of the present invention adding and dropping of users may be readily achieved. Adding a user, may be quite straight forward as long as there is an unused optical code available for it. This may be achieved by coding the new user's data and putting it on the fiber. Dropping a user may simply be achieved by stopping transmission on that particular optical channel and returning the corresponding optical code to storage making it available to the next new user.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

Preceding disclosures are presented in the spirit of showing how the vast bandwidth of a strand of fiber may be utilized in order to reliably carry data from a large number of users. In this pursuit, a specific implementation is described in order to concisely relate the system's operational concept. Accordingly, an implementation design using discrete optical components has been presented. One of ordinary skill will readily recognize that there are many ways of realizing each component as was briefly discussed about optical masks. One alternative embodiment of this system concept may be using Photonic Integrated Circuits (PIC) in design of various optical components and subsystems. This may be an efficient design approach due to its inherent integration property and ease of production characteristics. In another alternative embodiment, hybrid PIC and discrete optical component design may be another way of realizing this methodology.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A system comprising:
   code, the mask
   a transmitter (coder) architecture based on principles of Code Division Multiple Access (CDMA) for transmitting digital data of N-1 users simultaneously (N being a number power of 2), each user assigned a unique digital code of length N, this code employed to configure an optical masking unit in the receiver (decoder);
   a light source unit comprising a number of coherent lasers, the number of coherent lasers being at least equal to half the number of users plus one (N), each of the coherent lasers being configured for operation at a different specific prescribed operating frequency;
   a specific set of digital user codes that are orthogonal, (two codes u1 and u2 are orthogonal if quantity $u_1 u_2 - u_1 u_2^*$ is zero if $u_1 \neq u_2$ where $u_2^*$ is the complement of $u_2$);
   a procedure to generate such orthogonal code set;
   an on/off switching system for each user's laser array, imparting unique user digital identity code to each bit of transmitted data, the code having a code length of at least equal to a number of users plus one;
   a modulation unit being configured for applying the user's data to the coherent lasers; and
   an optical combiner unit being operable for combining outputs of the coherent lasers to an optical fiber input.

2. The system as recited in claim 1, further comprising a receiving unit being configured for decoding the user's data, said receiving unit at least comprising the user's mask code, a compliment of the user's mask code, and a differential detector.

3. The system as recited in claim 1, further comprising a frequency synthesizer unit be operable for controlling each of the coherent lasers at the different specific prescribed operating frequency.

4. The system as recited in claim 1, in which the mask code is chosen from a set of orthogonal codes.

5. The system as recited in claim 1, in which the mask code is transferable to a different user.

6. The system as recited in claim 1, in which said optical masking unit comprises optical bins having a bin bandwidth of number of users plus one (N) times the data bit rate.

7. The system as recited in claim 1, in which the number of users is a power of two minus one (N-1).

8. The system as recited in claim 1, in which the optical output of each user is coupled to a single optical fiber strand.

9. The system as recited in claim 6, in which each of the different specific prescribed operating frequency for a given user being separated by at least the optical bin bandwidth.

10. The system as recited in claim 9, in which, in the same optical bin, specific prescribed operating frequency of another user is separated from specific prescribed operating frequencies of the user by at least a bit rate of the user's data.

11. A system comprising:
    means for applying a user's mask code having a code length of at least equal to a number of users plus one (N);
    means for emitting coherent lights at different specific prescribed operating frequencies;
    means for applying the user's data to the coherent lights; and means for combining outputs of the coherent lights to an optical fiber input.

12. The system as recited in claim 11, further comprising means for decoding the user's data.

13. The system as recited in claim 11, further comprising means for controlling said means for emitting at the different specific prescribed operating frequencies.

14. An apparatus comprising:
a plurality of switch devices being configured for applying a user's mask code, the mask code having a code length of at least equal to a number of users plus one (N);
an array of narrow band coherent lasers, a number of coherent lasers being equal to the number of users plus one (N), each of said coherent lasers being operable for operation at a different specific prescribed operating frequency, said coherent lasers being coupled to said switches for applying the mask code;
a modulation input for applying the user's data to the coherent lasers; and
an optical combiner being operable for combining outputs of the coherent lasers to an optical.

15. The apparatus as recited in claim 14, further comprising a frequency synthesizer input for controlling each of the coherent lasers produce the different specific prescribed operating frequency.

16. The apparatus as recited in claim 15, in which the mask code is chosen from a set of orthogonal codes.

17. The apparatus as recited in claim 16, in which the mask code is transferrable to a different user.

18. The apparatus as recited in claim 17, in which the mask code is chosen from a set of orthogonal codes, said coherent lasers having a bin bandwidth, each of the different specific prescribed operating frequency being separated by at least the bin bandwidth the number of users is a power of two, specific prescribed operating frequencies of another user are separated from specific prescribed operating frequencies of the user by at least a bit rate of the user's data, and the optical fiber is coupled to a single optical fiber strand.

* * * * *